United States Patent

[11] 3,552,558

| [72] | Inventor | George W. Poncy |
| | | 59 Dale Drive, Chatham, N.J. 07928 |
| [21] | Appl. No. | 736,218 |
| [22] | Filed | June 11, 1968 |
| [45] | Patented | Jan. 5, 1971 |

[54] STERILE PACKAGE FOR CLINICAL THERMOMETERS AND THE LIKE AND METHOD OF MAKING IT
29 Claims, 10 Drawing Figs.

[52] U.S. Cl. ................................................. 206/63.2;
93/35; 128/260; 206/16.5
[51] Int. Cl. ..................................................... A61b 19/02;
B65d 85/08
[50] Field of Search .......................................... 206/16.6,
16.5, 56(A2), 63.2, 63.3, 47; 229/55; 128/260;
21/(Inquired); 93/35; 53/(Inquired)

[56] References Cited
UNITED STATES PATENTS
| 2,998,880 | 9/1961 | Ladd | 206/56(A2) |
| 3,114,643 | 12/1963 | Boston et al. | 206/56(A2UX) |
| 3,308,940 | 3/1967 | Morris, Jr. | 206/16.5 |

Primary Examiner—William T. Dixson, Jr.
Attorney—Max Wall

ABSTRACT: A sterile, disposable, sheath and sheath cover for thermometers and the like, and method of making it, packaged so as to preserve the sterility of the sheath during handling and storage, the sheath cover comprising the packaging material being strippable from the sheath along a tear seal to expose the same for clinical use when a thermometer or the like is inserted into the sheath. The package is particularly designed for economical mass production.

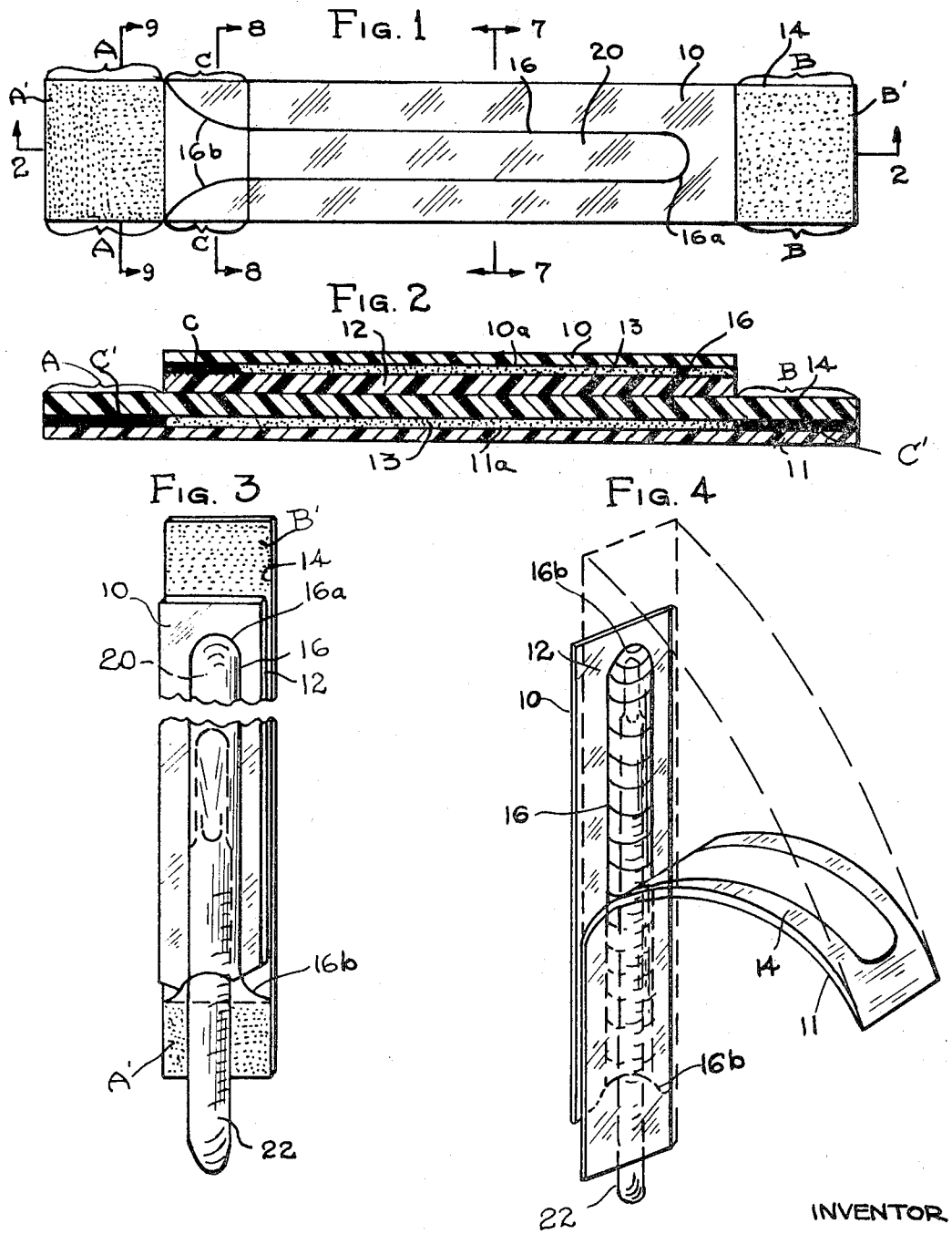

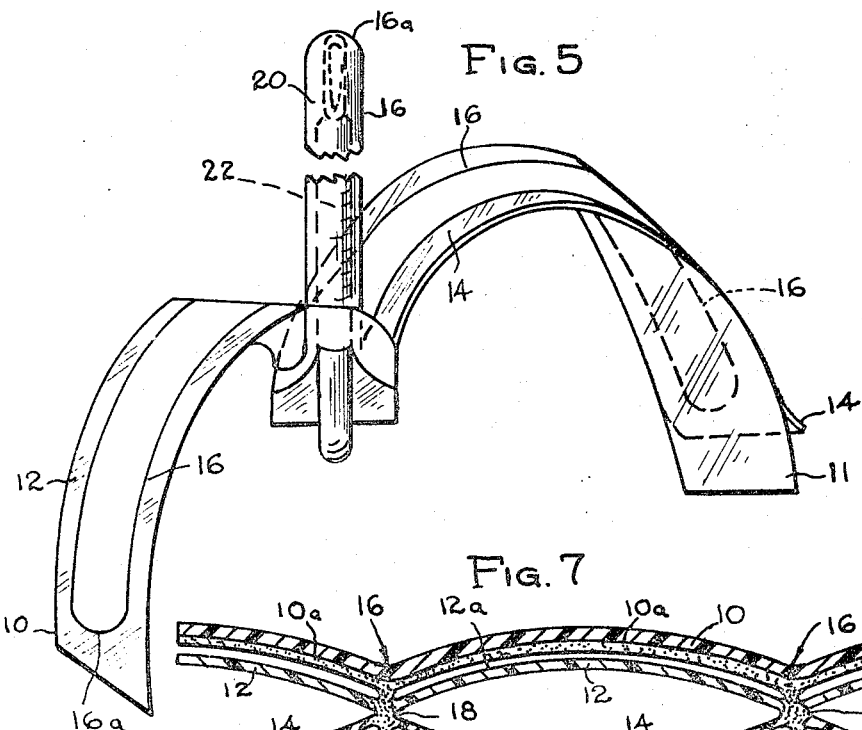
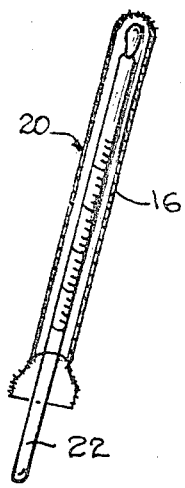
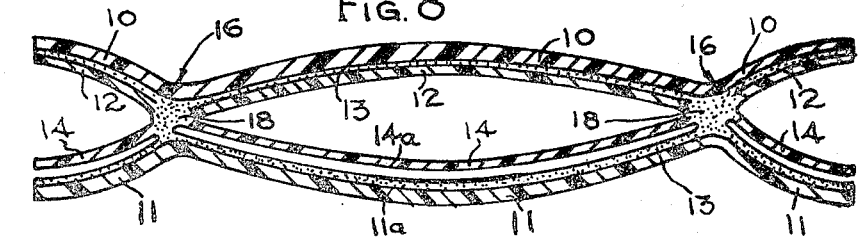
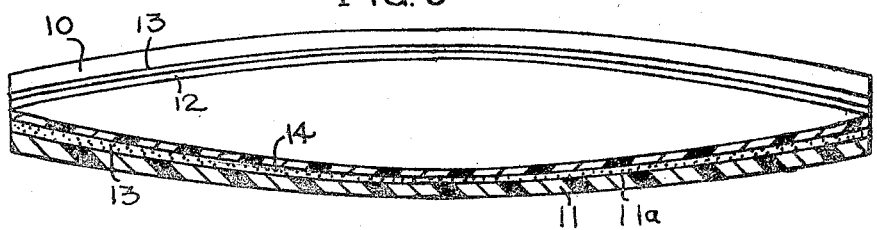
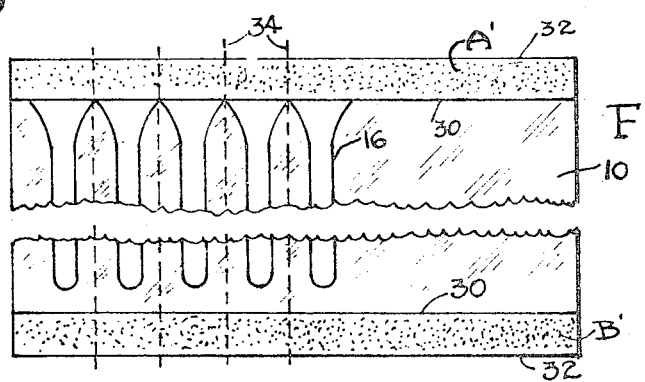
INVENTOR
GEORGE W. PONCY
ATTORNEY

STERILE PACKAGE FOR CLINICAL THERMOMETERS AND THE LIKE AND METHOD OF MAKING IT

This invention relates to improved sheath packages for products which are required to be sterile, including tools or instruments such as clinical thermometers, tongue depressors, probes and like instruments, used by the medical profession and other scientific personnel. While the sheath package is adaptable for use with a variety of objects, it will be described and illustrated, merely by way of example, in connection with a clinical thermometer.

While it is well known that the thermometer used in taking temperature readings must be in a state of sterility in order to avoid recontamination of the patient subsequent readings, or contamination of another patient, it is not as well known among laymen that present practices in hospitals or by doctors in their private practices, do not afford a sterile thermometer in most instances. The cross-contamination that can occur when the same thermometer is used on different patients is a constant hazard.

The shortcomings of the present practice with regard to sterility of thermometers is well recognized by the medical profession which, while cognizant of the dangers of such practice, does not have available a practical and economical means of facilitating the use of a thermometer which is sterile at each use. The various attempts to solve this problem, as evidenced by the prior art, has not been successful.

A principal object of the invention, therefore, is to provide, in a sterile, expendable package, a sterile, disposable sheath for such objects as clinical thermometers. Another object is to provide such a package into which a thermometer can readily be inserted by anyone, just prior to use thereof, so that the thermometer enters directly into a transparent sheath which has previously been sterilized and maintained in a sterile condition within the package in those areas which come into contact with the body of a patient, and from which the package can be stripped to expose the sterile sheath, whereupon the sheathed thermometer may be inserted into a body cavity, and a reading subsequently taken therefrom through said sheath, which may then be discarded. The thermometer may then, for subsequent use, be inserted into a new package and sheath without the necessity of sterilizing the thermometer itself after each use. This results in a substantial saving of time in the handling of the thermometer, and in the saving of money for the materials and supplies heretofore used to sterilize such objects. It will also serve to reduce the total number of thermometers required to be available.

Another object of the invention is to provide a transparent sheath for a thermometer in which the exterior of the sheath is sterilized and is maintained in a sterile condition by its enclosing package, which is also sterilized at those portions which come into contact with the sheath.

A further object is to provide such a device which is disposable and can be mass produced in very substantial quantities in a short space of time at such low cost that is will be competitive with prior devices and methods for using thermometers and other devices which must be kept sterile in use to prevent contamination of patients.

The following specification and accompanying drawings describe and illustrate a preferred embodiment of the invention.

FIG. 1 is a plan view of the package, in strip form, showing the sheath within it.

FIG. 2 is a substantially enlarged, central, longitudinal sectional view of FIG. 1, taken along line 2-2 thereof.

FIG. 3 is a perspective view of the sheath package with a thermometer partially inserted therein.

FIG. 4 is a perspective view of the reverse side of the sheath package with a thermometer fully inserted therein, with one portion of the package, the back or bottom, partially stripped therefrom to expose one side of the sheath.

FIG. 5 is a perspective view of the sheath package, with a thermometer inserted therein, and with both front and back portions of the package partially stripped away to expose the sheathed thermometer.

FIG. 6 is a perspective view of the sheathed thermometer after both the front and back portions of the package have been fully stripped away from the sheath.

FIG. 7 is an exaggerated and enlarged transverse sectional view taken along the line 7-7 of FIG. 1, showing the several separate layers of material used, and the portion along which a seal is made to form the sheath.

FIG. 8 is a similar view taken along the line 8-8 of FIG. 1.

FIG. 9 is a similar view taken along the line 9-9 of FIG. 1.

FIG. 10 is a plan view of a continuous sheet illustrating the method of making the item by mass production and showing the web from which the individual strips of FIG. 1 are cut.

As best shown in FIGS. 1 and 2, the invention comprises a plurality of layers of sterilizable strips of impervious paper and impervious films of thermoplastic materials joined by heat sealing in a manner to be explained. The front and back, or upper and lower sheets 10, 11 respectively, are thin sheets or strips of paper, preferably glassine, each coated over one entire surface 10a, 11a with a very thin coating of a thermoplastic material 13. This coating is preferably of the order of one-half mil, or less. The intermediate sheets 12, 14, are thin films or sheets of impervious transparent, thermoplastic material, each of the order of about one mil in thickness, the upper sheet 12 being substantially coextensive in length and width with that of the superimposed paper strip 10, the lower sheet 14 being substantially coextensive in length and width with that of the back strip 11, the upper strips 10 and 12 being shorter in length than the lower strips 11 and 14, the upper strips being so placed over the lower strips 11 and 14 as to leave a marginal end portion of said strips in the nature of a tab, exposed at each end of the strips 10, 12, for a purpose which will appear. The areas so exposed are stippled in the drawings and are bracketed at A and B in FIG. 1, and form end tabs A', B', respectively. The thermoplastic strips 12, 14, each preferably have a thickness less than that of the glassine strips 10, 11 and are sandwiched between the latter. The thicknesses of the several layers are exaggerated in the drawings for clarity of illustration.

The strips 10, 12 are sealed or welded to each other at one end, over the area indicated at C in FIG. 1, and as more explicitly indicated in FIG. 2. The strips 11, 14 are sealed or welded to each other at each end, over the areas indicated at C', which correspond to areas A and B in FIG. 1. The remaining areas of the strips are, or may be, in physical contact, but are not sealed to each other except as indicated below. The line 16 in FIG. 1 indicates a crease which extends through the several layers, the impression being made by an electronic die (not shown) in a high frequency heat-sealing press (not shown) and forms from the intermediate strips 12 and 14 the outline of an elongated sheath or pocket closed at one end 16a, and open at the other end to the atmosphere with a flaring or funnellike mouth 16b, adapted to receive a thermometer or like instrument. This seal along the line 16 makes a visual impression on the paper strips 10 and 11 and forms a tear seal, between the paper strips, in the thermoplastic strips 12, 14, which are thus joined together in a weld when subjected to the heat and pressure mentioned above. This unites the several layers along the line 16 as best shown in FIGS. 7, 8, 9, where the thermoplastic coatings 13 and the adjacent portions of the thermoplastic layers 12, 14, all flow together under the influence of the heat induced in the material by the high frequency current and the pressure of the die (not shown) to weld or fuse these together into one coherent mass, as shown in the enlarged and exaggerated areas 18 in these views. This tear seal also maintains the sheath in fixed position with respect to its container. The thickness and curvature of the materials in FIGS. 7, 8, 9 are enlarged and exaggerated for the purpose of clarity of exposition. The sheath package is actually a thin, flat strip in its finished form, as will be evident from the material thicknesses previously described.

The action of the die (not shown) has the effect of weakening the thermoplastic material along the center of the line 16 of the seal formed by said die so that the plastic portions thereof outside the boundary of the sheath formed by the seal can be torn away, the remaining portions of the thermoplastic material adhering to the strip 11 along the edge of the line formed by the seal. The upper and lower paper strips act as buffers between the die and the bed of the press, and to some extent prevent the total destruction of the thermoplastic material by the heat induced therein, and these buffer strips actually become a part of the sheath package itself. The coating 13 on the paper strips additionally forms a protective surface or barrier against sheath contamination which might possibly occur due to any porosity which may exist in the paper used. The impression line 16 also serves as a visual guide for the insertion of the thermometer into the sheath package.

The adjacent or meeting faces of the strips 10 and 12, and those of the strips 11 and 14, respectively, are sterilized by subjecting these surfaces to ultraviolet exposure right up to the moment these surfaces are joined during assembly, but sterilization is preferably carried out on the facing surfaces of the strips 10 and 11 after they have been coated with the coating 13. Alternatively, sterilization of the completely fabricated sheath package may be effected subsequent to assembly in any other suitable or appropriate manner.

In some applications, it may be desirable to use cloth fabric as a cover material substitute for the glassine paper, in which event the coating 13 would seal the fabric to render it impervious.

The application of the die to the superimposed sheets of material results in the formation of the sheath 20, FIGS. 5 and 6 from the two strips 12 and 14, with the result that the sheath is thus fully enclosed in a sterile atmosphere. Only the interior surfaces of the sheath are exposed to the atmosphere at the mouth 16b thereof, the mouth being open, the exterior surfaces 12a, 14a are shown in FIG. 7, being closed to the atmosphere along the sides and at one end by the seal 16, and at the ends of the strips by the seals C, C', as best shown in FIG. 2.

The material of the facing coating 13 on the outer paper strips 10, 11, and the material of the sheath may be of any suitable thermoplastic, preferably, vinyl, and more particularly ethylene-vinyl-acetate, this particular formulation having been found to be most suitable for the purposes of this invention. The coating on the paper strips, alternatively, may be of a pressure-sensitive-type cement.

The sheath package may be freely handled without special precautions as the outer surfaces of the sheath 20 are wholly enclosed within the sterile surfaces of the outer cover strips 10, 11, until the cover is stripped away as disclosed in FIGS. 4, 5 and 6 to expose the sterile sheath for insertion into any body cavity. The sheath, being a very thin, transparent, film enclosing the thermometer, and formed from the welded layers 12, 14, provides negligible insulation against heat transfer, yet has sufficient strength for the intended purpose and permits an accurate reading of the thermometer. The sheathed thermometer 22 has the additional advantage that should the thermometer break, as sometimes occurs, in the body of a patient, removal of the entire contents is simplified by the fact that the broken glass pieces are held by the sheath. The material of the sheath has a greater tensile strength than that of the glassine cover so that the body of the sheath is resistant to tearing as the cover, FIG. 5, is stripped away.

It will be understood that a variety of tools and instruments requiring sterilization in use can be encapsulated in a similar manner by accommodating the configuration and dimension of the tear seal substantially to the outline of the desired object.

In use, the sheath package may be grasped by the end tab A' or along either side, and the thermometer or other object 22 may be inserted into the mouth of the sheath at 16b and pushed inwardly until it fully occupies the sheath and is stopped by the end seal 16a. Of course, the thermometer is inserted mercury bulb first. The paper strips 10, 11, and the respective cohering waste portions of the thermoplastic strips 12, 14, are then stripped or peeled away from the sheath, along the line 16, against the leverage afforded by the inserted thermometer, by gripping and pulling the tab at the opposite end B', separation taking place along the center of the tear seal line 16, leaving the irradiated and sterile exterior surfaces 12a, 14a of the sheath, FIG. 7, exposed, as at 20, FIG. 6. The stripped portions are discarded. The thermometer is thus covered with a transparent sheath which is entirely sterile along its entire exposed surface which requires sterilization to avoid transmission of disease or infection, and through which the graduations on the thermometer may be read with ease. After use, the sheath is easily slipped off the instrument and disposed of. The same thermometer is immediately available for reuse on the same or another patient without sterilization, by insertion into another sheath package according to this invention and stripping the outer cover therefrom as described above.

The foregoing sheath package is particularly designed so as to enable it to be manufactured in large quantities by mass production methods, whereby to reduce the cost of the individual sheath package to a negligible (fraction of a cent) amount, so that it may be used and expended freely without regard to cost. In the manufacture of the sheath package, the four layers of material 10, 11, 12, 14, in superimposed or in face-to-face position, are simultaneously fed in continuous sheet or strip form to a high frequency electronic sealing press (not shown) which is well known in the art. The method of making the strips of FIG. 1, which comprises four separate sheets of material, is as follows.

The strips 10 and 12 are continuously fed in web form from supply rolls towards a press (not shown), with the strip 10 over the strip 12. Simultaneously, the strips 11 and 14 are similarly fed towards a second press with the strip 14 facing upwardly. The adjoining or contacting surfaces of the strips 10, 12 and 11, 14, respectively, are subjected to the action of ultraviolet rays before they are brought into contact with one another, but after the coating 13 has been applied to the strips 10, 11. After the strips 10, 12 are brought into contact, a continuous marginal seal C, FIGS. 1 and 2, is formed adjacent one edge. After the strips 11 and 14 are brought into contact, a continuous marginal seal C', at A and B, FIGS. 1 and 2, is formed adjacent each edge of the combined strips. The layers 10, 12, forming the upper strip, are then placed over the layers 14, 11, forming the lower strip, in such fashion that the edges 30, FIG. 10, of the upper strip are spaced from the respective adjacent edges 32 of the lower strip, and the combined strips are then subjected to the repeated action of a die in the press mentioned to form the strip shown in FIG. 10, where they are joined or welded together along the die line 16. The individual sheath packages, as shown in FIG. 1, are then formed by cutting the strip of FIG. 10 along the lines 34.

I claim:

1. A flexible sheath package for clinical tools and instruments comprising:
   a. a sheath body of heat sealable material having an open end for the insertion of an instrument;
      1. said sheath having a sterilizable exterior surface;
   b. a separable, disposable outer cover for said sheath comprising heat sealable material wholly enclosing the outer surfaces of the sheath and sealed thereto on each side at the area of said sheath opening;
      1. said cover having a sterilizable interior surface;
   c. said sheath being defined by a seal line in the form of a tear seal, said tear seal joining said sheath and said cover together along the line of said seal, thereby enclosing said sheath body within the interior body of said cover; and
   d. said outer cover and the waste portions of said sheath material outside of said seal line being separable from said sheath along said tear seal to expose said sheath for clinical use when said instrument is inserted therein.

2. A sheath package for clinical instrument according to claim 1, in which the outer cover comprises paper having a sealable coating on the interior surface thereof.

3. A sheath package according to claim 1, in which the outer cover comprises a cloth having a sealable coating on the interior surface thereof.

4. A sheath package according to claim 1 in which said outer cover comprises upper and lower layers of heat sealable material, and said sheath comprises upper and lower layers of heat sealable material, the layers forming the sheath being sandwiched between said upper and lower layers of said outer cover.

5. A sheath package according to claim 1, in which said outer cover comprises a material different in kind from that of said sheath.

6. A sheath package according to claim 4, in which the material of the outer cover comprises paper having its facing surfaces coated with said heat sealable material.

7. A sheath package according to claim 5 in which the paper is glassine.

8. A sheath package according to claim 4 in which the outer upper and lower layers are each separately strippable from said sheath.

9. A sheath package according to claim 4, in which each layer of said sheath is of a thickness less than that of each layer of the outer cover.

10. A sheath package according to claim 1 in which the material of said outer cover comprises glassine, said glassine being of a thickness greater than that of the material of said sheath.

11. A sheath package according to claim 1 in which said heat sealable material is ethylene-vinyl-acetate.

12. A sheath package according to claim 1 in which the interior surface of said cover and the exterior surface of said sheath are sterilized.

13. Means for sheathing instruments against transmission of infectious diseases comprising an assembly having:
   a. upper and lower layers of material with heat sealable, sterilizable facing surfaces;
   b. intermediate layers of heat sealable, sterilizable material disposed between said upper and lower layers;
      1. each of said intermediate layers being in contact with the respective adjacent heat sealable facing surface and with each other;
      2. each of said intermediate layers being sealed along a marginal portion to its adjacent outer layer;
   c. all of said layers being united by a seal defining the outline of the sheath, whereby a sheath is formed by said intermediate layers within the line defining said seal, said line forming a tear seal in said intermediate layers, said sheath having an open end and a closed end;
   d. said upper and lower layers being strippable from said sheath and from each other substantially along said tear seal to expose said sheath for clinical use when an instrument is inserted therein.

14. Means according to claim 13 in which said upper and lower layers are paper having thermoplastic coated facing surfaces.

15. Means according to claim 13 in which one of said layers is longer than the other to form a projecting tab at each end of said assembly.

16. Means according to claim 13 in which said layers are in the form of strips.

17. Means according to claim 15 in which said sheath is formed between said tabs.

18. A sheath package according to claim 1, in which the said seal line forms a visual impression on the surface of said outer cover to guide the insertion of an instrument into said sheath.

19. Means according to claim 13 in which the contacting surfaces of the respective upper and lower, and their adjoining intermediate, layers are sterilized.

20. A flexible sheath package for instruments comprising:
   a. an outer cover having a heat sealable coating on its inner surface;
   b. an inner sheath member of heat sealable material;
   c. said cover and sheath having an opening for the insertion of an instrument into said sheath;
   d. said sheath comprising a material having a greater tensile strength than said outer cover material; and
   e. the walls of said cover and sheath being welded along the tear seal line;
      1. said line outlining and defining said sheath, and
      2. said cover being strippable from said sheath along said tear seal line upon the insertion of an instrument into said sheath, whereupon said sheathed instrument is exposed for insertion into a body cavity.

21. A sheath package according to claim 20 in which said package comprises a strip having said opening at one end and a tab at the other end for stripping said cover from said sheath.

22. A sheath package according to claim 20, wherein said tear seal line defines the outline of the instrument to be inserted into said sheath.

23. A sheath package according to claim 20, wherein said tear seal maintains said sheath in a fixed position with respect to said outer cover.

24. A flexible sheath package for clinical tools and instruments comprising:
   a. a sheath body of sealable material having an open end for the insertion of an instrument;
      1. said sheath having a sterilizable exterior surface;
   b. a separable, disposable outer cover for said sheath comprising sealable material wholly enclosing the outer surfaces of said sheath and sealed thereto on each side at the area of said sheath opening;
      1. said cover having a sterilizable interior surface;
   c. said sheath being defined by a seal line in the form of a tear seal, said tear seal joining said sheath and cover together along the line of said seal, thereby enclosing said sheath body within the interior body of said cover; and
   d. said outer cover and the waste portions of said sheath material outside of said seal line being separable from said sheath along said tear seal to expose said sheath for clinical use when said instrument is inserted therein.

25. A sheath package according to claim 24 in which the material for the outer cover is cloth and in which the sealable material thereof is a pressure-sensitive-type cement.

26. The method of making sterilizable sheath packages for clinical thermometers and like instruments, requiring sterilization before use, from a plurality of separate layers of sheet material, comprising:
   a. simultaneously feeding a continuous, impervious, thermoplastic coated sheet material into contacting relationship with a transparent, impervious, thermoplastic sheet with the thermoplastic sheet facing downwardly;
   b. simultaneously feeding similar sheets of greater width than said first mentioned sheets, with the thermoplastic sheet facing upwardly;
   c. subjecting the moving contacting faces of said sheets to the action of ultraviolet rays to sterilize the surfaces thereof before they are brought into said contacting relationship;
   d. forming a continuous seal between the first of said two sheets along one edge thereof, said sheets forming an upper layer of said sheath package;
   e. forming a continuous seal between the second of said two sheets, along each edge thereof, said sheets forming a lower layer of said sheath package;
   f. superimposing said upper layer over said lower layer with the thermoplastic sheets thereof in facing contact, with the edges of said upper layer spaced from the edges of said lower layer; and
   g. subjecting said superimposed moving layers, between said edge seals of said upper layer, to the repeated action of a die to form successive spaced seals in said thermoplastic sheets, sealing them together along the line formed by said die, said die line defining an enclosure, open at one end, between said thermoplastic sheets, to receive an instrument such as a clinical thermometer.

27. The method of making sheath packages for clinical thermometers and like instruments from a plurality of separate layers of sheet material comprising:
   a. simultaneously feeding a continuous, impervious, thermoplastic coated sheet material into contacting relationship with a transparent, impervious, thermoplastic sheet, with the thermoplastic sheet facing downwardly;
   b. simultaneously feeding similar sheets of greater width than said first mentioned sheets, with the thermoplastic sheet facing upwardly;
   c. forming a continuous seal between the first of said two sheets along one edge thereof, said sheets forming an upper layer of said sheath package;
   d. forming a continuous seal between the second of said two sheets, along each edge thereof, said sheets forming a lower layer of said sheath package;
   e. joining said upper layer to said lower layer with the thermoplastic sheets thereof in facing contact, with the edges of said upper layer spaced from the edges of said lower layer; and
   f. subjecting the said joined moving layers, between said edge seals of said layers, to the action of a die to form successive spaced seals in said thermoplastic sheets, sealing them together along the line formed by said die, said die line defining an enclosure, open at one end, between said thermoplastic sheets, to receive an instrument.

28. The method of claim 27, including the step of cutting said sheets along a line disposed substantially between said die impressions to form individual sheath package strips.

29. The method of claim 28, including the step of stripping off said upper and lower layers along said die line of a strip to expose said enclosure.